've# 3,000,959
NITRO-CONTAINING UNSATURATED ALDEHYDES

Karl Klager, Monrovia, Calif., assignor to Aerojet-General Corporation, Azusa, Calif., a corporation of Ohio
No Drawing. Filed Jan. 22, 1957, Ser. No. 635,544
15 Claims. (Cl. 260—601)

This invention relates to new compositions of matter. In particular, it relates to nitro-containing unsaturated aldehydes, having the general formula:

$$R-CH_2-\underset{\underset{CH_2}{\|}}{C}-CHO$$

wherein R is a nitro-substituted alkyl group.

This application is a continuation-in-part of my copending application No. 391,128, filed November 9, 1953, now abandoned.

The aldehydes of my invention readily undergo oxidation in the conventional manner to form unsaturated nitro-substituted acids. They can also be reduced in the conventional manner by substances such as lithium aluminum hydride to form unsaturated nitro-substituted alcohols. The nitro alcohols and nitro-substituted acids obtained in this manner are useful in the preparation of solid rocket propellants. For example, either the acid or the alcohol prepared in the above described manner can be incorporated, in amounts up to about 10% by weight, in the binder resins of the propellants disclosed in the assignee's copending United States patent application No. 109,409, filed August 9, 1949, and serve to improve and increase the specific impulse of the resultant propellant through the presence of additional oxygen provided by the nitro groups within the binder resin itself. The addition of these materials does not alter in any appreciable manner the processing and curing of these propellant materials.

The solid propellants thus produced can be used as a primary propulsion source in rocket-propelled vehicles, and can also be used as a propellant for artillery missiles. When used as the primary propulsion source for rocket vehicles, they can be conveniently ignited by a conventional igniter, as for example the igniter disclosed in assignee's copending patent application Serial No. 306,030, filed August 23, 1952. The propellant is preferably cast in tubular form and restricted in the conventional manner with a relatively inert resin, such as a non-nitrated polyurethane foam or a polyester resin, and placed inside a chamber having one end open and leading into a conventional venturi rocket nozzle. Upon ignition, large quantities of gases are produced and exhausted through the nozzle creating propulsive force.

The compounds of this invention are prepared by reacting a saturated nitro-containing aldehyde with formaldehyde in the presence of a secondary amine salt of a mineral acid, in accordance with the general reaction scheme set forth below:

$$R-CH_2CH_2-CHO+CH_2O \longrightarrow R-CH_2-\underset{\underset{CH_2}{\|}}{C}-CHO$$

wherein R is a nitroalkyl group.

Any secondary amine salt of a mineral acid can be used in the practice of this invention. Mineral acid salts of dialkyl amines, diaryl amines, alkyl aryl amines, heterocyclic amines, etc., are all useful in the practice of this invention. The mineral acid providing the anion group of the salt can be any mineral acid such as hydrochloric, nitric, sulfuric, phosphoric, etc. For economic reasons and ease of separation, I prefer to use dialkyl amine hydrochlorides, such as dimethyl amine hydrochloride, or the hydrochlorides of a heterocyclic amine, such as piperidine hydrochloride.

It is preferable to conduct the reaction in the presence of an inert solvent such as methanol, ethanol, butanol, dioxane, tetrahydrofuran, etc.

The saturated nitro-substituted aldehydes employed in carrying out this invention are prepared by the addition of a labile hydrogen-containing nitroalkane to acrolein. Polynitro-containing ethanes, propanes, butanes, pentanes, hexanes, heptanes, octanes, nonanes, etc. in all of their isomeric forms undergo this reaction to produce the nitro-substituted alkyl acroleins used as starting materials.

To more fully illustrate my invention the following examples are presented. It is to be understood, however, that these examples are not intended to limit the scope of the invention in any way and are presented merely as a means of illustration.

EXAMPLE I

*Preparation of 2-methylene-4,4-dinitropentanal in the presence of dimethylamine hydrochloride*

A reactor provided with a stirrer, reflux condenser and thermometer was charged with 1440 ml. absolute ethanol, 500 gm. (6 moles) dimethylamine hydrochloride, 180 gm. (6 moles) p-formaldehyde, and 1056 gm. (6 moles) 4,4-dinitropentanal. The mixture was stirred and heated on a steambath to a temperature of 75–80° C. As the reaction started, the temperature of the mixture rose to 85–90° C., and a homogeneous solution formed. The mixture was refluxed and stirred for 2 hours at a temperature of 85–90° C. The resulting solution was cooled and diluted with methylene chloride and water. The methylene chloride, containing the product, separated from the reaction mixture. It was filtered and molecularly distilled at a temperature of 50–90° C./0.05 mm. to yield 635 gm. (60%) 2-methylene-4,4-dinitropentanal, $n_D^{25}$ 1.4773, B.P. 96° C./0.018 mm.

The product was reacted with semicarbazide hydrochloride in a conventional manner to yield the semicarbazone derivative, M.P. 204° C.

EXAMPLE II

*Preparation of 2-methylene-4,4-dinitropentanal in the presence of piperidine hydrochloride*

By employing 1440 ml. absolute ethanol, 729 gm. piperidine hydrochloride, 180 gm. (6 moles) p-formaldehyde and 1056 gm. (6 moles) 4,4-dinitropentanal and following the procedure described in detail in Example I, 2-methylene-4,4-dinitropentanal, B.P. 96° C./0.018 mm., $n_D^{25}$ 1.4773 in 60% yield was produced.

Both higher and lower homologues of the new series of unsaturated nitro-substituted aldehydes of my invention can be prepared in accordance with the method disclosed above simply by reacting appropriate starting materials. For example, 2-methylene-4,4,4-trinitrobutanal, 2-methylene-4,4-dinitrohexanal, 2-methylene-4-nitrobutanal, 2-methylene-4,4-dinitrooctanal, 2-methylene-5,5-dinitrohexanal and 2-methylene-4-nitro-4-methyl-hexanal are prepared by condensing 4,4,4-trinitrobutanol, 4,4-dinitrohexanol, 4-nitrobutanol, 4,4-dinitrooctanol, 5,5-dinitrohexanol and 4-nitro-4-methyl-hexanol, respectively, with formaldehyde in the presence of a secondary amine salt of a mineral acid, in accordance with the teachings of this invention. It will be appreciated that other members of this series can be prepared simply by reacting appropriate starting materials.

I claim:

1. As compositions of matter, the nitro aldehydes having the formula:

$$R-CH_2-\underset{\underset{CH_2}{\|}}{C}-CHO$$

wherein R is a nitrosubstituted lower alkyl group.

2. As a composition of matter, 2-methylene-4,4-dinitropentanal having the structural formula:

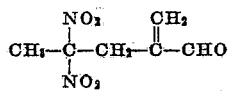

3. As a composition of matter, 2-methylene-4,4,4-trinitrobutanal having the structural formula:

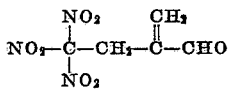

4. As a composition of matter, 2-methylene-4,4-dinitrohexanal having the structural formula:

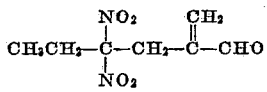

5. As a composition of matter, 2-methylene-4-nitrobutanal having the structural formula:

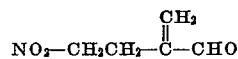

6. As a composition of matter, 2-methylene-4,4-dinitrooctanal having the structural formula:

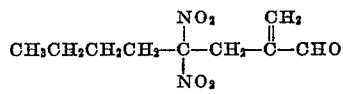

7. As a composition of matter, 2-methylene-5,5-dinitrohexanal having the structural formula:

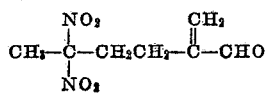

8. As a composition of matter, 2-methylene-4-nitro-4-methyl-hexanal having the structural formula:

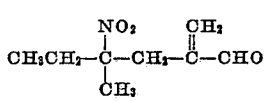

9. The method of making nitro aldehydes having the formula:

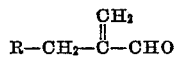

which comprises reacting formaldehyde with a nitro aldehyde having the formula:

wherein R is a lower nitroalkyl group, in the presence of a secondary amine salt of a mineral acid.

10. The method of claim 9 wherein the amine salt used is dimethylamine hydrochloride.

11. The method of claim 9 wherein the amine salt used is piperidine hydrochloride.

12. The method of preparing 2-methylene-4,4-dinitropentanal which comprises reacting 4,4-dinitropentanal with formaldehyde in the presence of a secondary amine salt of a mineral acid.

13. The method of claim 12 wherein the amine salt used is dimethylamine hydrochloride.

14. The method of claim 12 wherein the amine salt used is piperidine hydrochloride.

15. The method of claim 12 wherein the reaction is conducted at a temperature of from about 75° to 90° C.

No references cited.